July 7, 1925. 1,544,986
O. HOVDEN
FISH BEHEADING AND ENTRAILS REMOVING MACHINE
Filed July 9, 1923 2 Sheets-Sheet 2
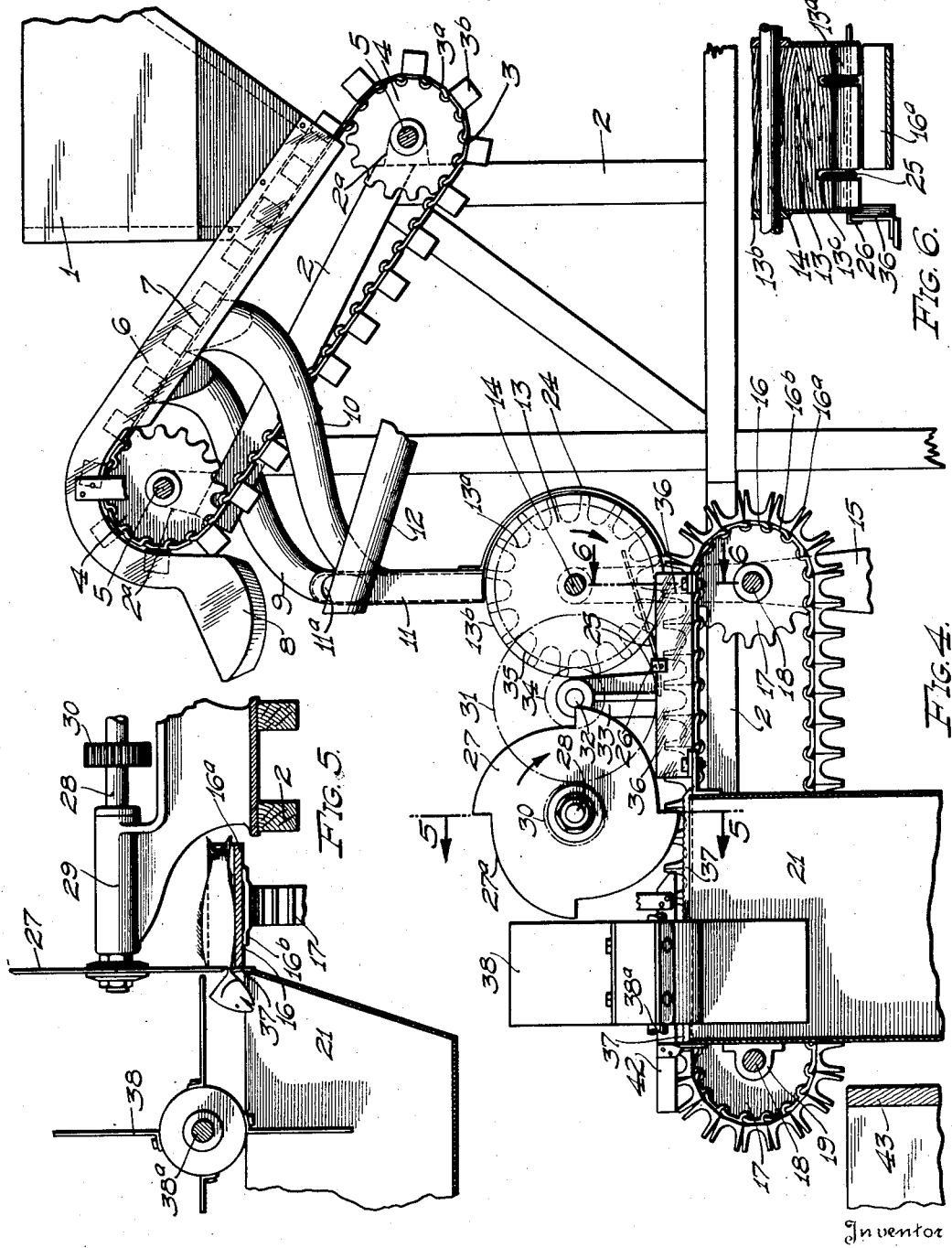
Inventor
OLAV HOVDEN.
By A. B. Bowman
Attorney Patented July 7, 1925.

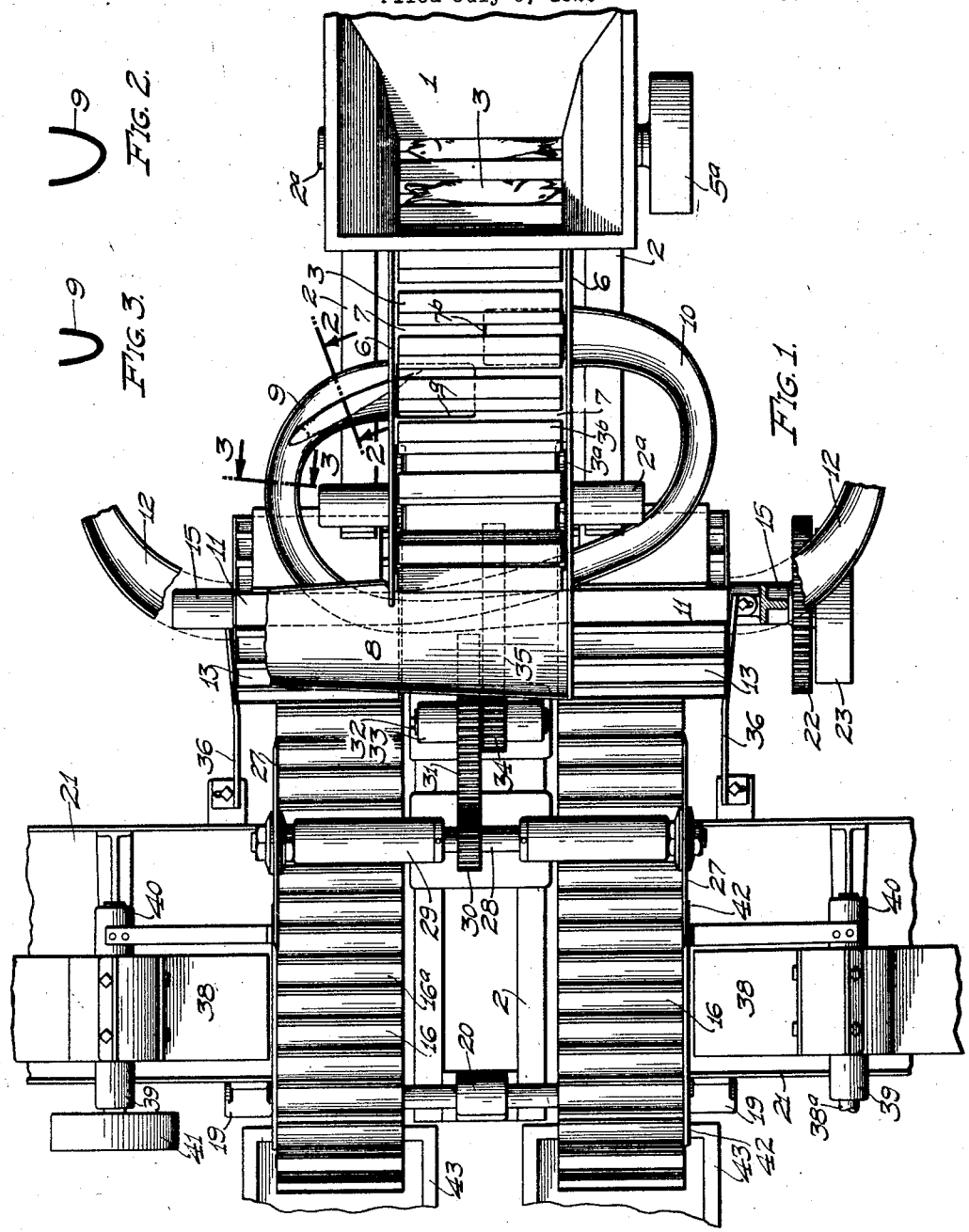

1,544,986

UNITED STATES PATENT OFFICE.

OLAV HOVDEN, OF MONTEREY, CALIFORNIA.

FISH BEHEADING AND ENTRAILS-REMOVING MACHINE.

Application filed July 9, 1923. Serial No. 650,415.

*To all whom it may concern:*

Be it known that I, OLAV HOVDEN, a citizen of the United States, residing at Monterey, in the county of Monterey and State of California, have invented a certain new and useful Improvement in Fish Beheading and Entrails-Removing Machines, of which the following is a specification.

My invention relates to fish beheading and entrails removing machines, and the objects of my invention are: First, to provide a machine of this class which will receive fish from a supply hopper and direct and so position the same that their heads may be cut off and their entrails removed; second, to provide a machine of this class in which the fish from the supply hopper are always fed to the cutting means of the machine in the same way, and in which the heads of the fish are cut off by partially cutting the back side and partially the under side of the fish, but in which the knife will not cut through the entrails; third, to provide a machine of this class in which the fish, with the heads partially cut off, are fed past a paddle wheel which engages the heads of the fish and removes the same from the body by impact, and at the same time removes the entrails from the body; fourth, to provide a machine of this class in which an over supply of fish fed into the machine will be returned, by overflow means, to the supply hopper; fifth, to provide novel fish directing, turning and positioning means in connection with a machine of this class; sixth, to provide novel incising means for the back and under sides of the fish; seventh, to provide as a whole a novelly constructed machine of this class, and eighth, to provide a machine of this class which is very simple and economical of construction proportionate to its functions, durable, efficient, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a fragmentary plan view of my fish beheading and entrails removing machine; Fig. 2 is a transverse sectional view of the chute by means of which the fish are directed from the feed conveyer to the feed hopper, with the section taken through 2—2 of Fig. 1; Fig. 3 is a similar sectional view of said chute with the section taken through 3—3 of Fig. 1; Fig. 4 is a fragmentary side elevational view of my machine with certain parts and portions thereof removed and others broken away and in section to facilitate the illustration; Fig. 5 is a sectional elevational view thereof, taken through 5—5 of Fig. 4, and Fig. 6 is a fragmentary sectional elevational view, taken through the feed wheel, as indicated by 6—6 in Fig. 4.

Like characters of reference refer to similar parts and portions throughout the several views of the drawings.

The supply hopper 1, frame 2, conveyer 3, sprockets 4, shafts 5, side members 6, conveyer bottom plate 7, trough 8, chutes 9 and 10, feed hoppers 11, overflow chutes 12, feed wheels 13, shaft 14, journal members 15, conveyers 16, sprockets 17, shafts 18, journals 19 and 20, waste bins 21, gears 22, drive pulley 23, guard 24, extractors 25, supports 26, cutting members 27, spindle 28, journal 29, gears 30 and 31, shaft 32, journal 33, gears 34 and 35, positioning guide members 36, stationary cutting members 37, paddle wheels 38, journals 39 and 40, pulleys 41, fish retaining members 42, and the bins 43, constitute the principal parts and portions of my fish beheading and entrails removing machine.

The supply hopper 1, which supplies the machine with fish to be treated for packing or canning, is supported on a frame 2 and is provided with a downwardly converging bottom and an opening at its lower end. A bottomless and endless conveyer 3 is mounted contiguous to said hopper so that the same passes the opening at the lower end of the supply hopper 1 and consists of a pair of endless link chains 3ª, mounted on sprockets 4, and cleats 3ᵇ secured at their ends to said chains. The sprockets 4 are mounted on shafts 5 which are revolubly supported in journals 2ª mounted on the frame 2. One of said shafts is provided with a pulley 5ª for driving said conveyer. Positioned on either side of the conveyer 3, contiguous to the ends of the cleats thereon and extending from the supply hopper 1 forwardly and upwardly to its front end, are the side members 6 which prevent the fish from falling from the sides of the conveyer. Positioned below the cleats 3ᵇ of the conveyer is the plate 7 which extends from below the hopper 1 forwardly to the forward end of the conveyer and between the forward sprockets 4. Said plate 7 is secured to the side members 6 intermediate the sprockets and below the chains 3ᵃ, while the side members 6 are supported respectively at their rear and front ends by the hopper 1 and journals 2ᵃ. At the forward end of the conveyer 3 is positioned the overflow trough 8, which is supported by the side members 6. It will be noted that the fish carried by the conveyer over the plate 7 and discharged into the overflow trough 8 are returned to the supply hopper in any convenient manner, preferably by gravity, when space permits the positioning of the supply hopper low enough. The bottom plate 7 supporting the fish between the cleats 3ᵇ of the conveyer is provided with openings 7ᵃ and 7ᵇ, one on either side of the median line of the conveyer and one positioned forwardly of the other, substantially as shown in Fig. 1 of the drawings. The opening 7ᵃ communicates with the one end of the chute 9, which chute is considerably enlarged at said end and which gradually decreases in width towards its other end, which latter end communicates with a vertical narrow feed hopper 11, one being positioned on either side of the machine. The chute 9 extends in curved form from the conveyer to the feed hopper and is inclined downwardly so that the fish will be fed from the conveyer to the feed hopper by gravity. The opening 7ᵇ communicates with the one end of the chute 10, which is similarly shaped, constructed and positioned and is connected at its other end with the other feed hopper 11 in a similar manner.

It will be noted that as the fish are singly fed into and conveyed upwardly by the conveyer 3, some positioned with the heads in one direction and others in the other direction, they will be discharged in one or the other of the chutes 9 and 10 through the opening 7ᵃ or 7ᵇ, depending upon their position. It will be here noted that the forward half of the fish is heavier than its rear half and they will consequently be overbalanced when carried forwardly by the conveyer over the respective openings in the bottom plate 7.

The feed hoppers 11 are provided at their upper ends and outer sides with openings 11ᵃ so that when the feed hoppers are filled with fish, other fish discharged into said hoppers from the chutes 9 and 10 will be carried on through the hopper by reason of their momentum into the overflow chutes 12, positioned on either side of said feed hoppers and which communicate with the openings 11ᵃ therein, and by reason of which the surplus fish are carried back to the supply hopper by any convenient means. Below each of said feed hoppers are positioned the feed wheels 13 mounted on the shaft 14, revolubly mounted in the journal members 15. Said feed wheels are provided with a plurality of longitudinal slots or pockets 13ᵃ in their outer faces to receive the fish, and also with side plates 13ᵇ to retain the fish in position in said pockets. Below each of said feed wheels are positioned the endless pocket conveyers 16, which consist of a plurality of channels or pocket members 16ᵃ secured intermediate their ends on their back sides to the link chains 16ᵇ, which are mounted on the sprockets 17, secured to the shafts 18, the rear one of which is revolubly mounted in the journal members 15 and the forward one of which is mounted in the journals 19 and 20, the former being preferably supported on the bins 21 and the latter on the frame 2. The shafts 14 and 18 are provided at their one end with gears 22, which mesh with each other, and are adapted to operate the feed wheels 13 and the conveyers 16 at the same peripheral speed, by reason of which the pockets or channels in the feed wheels 13 and the conveyers 16 are synchronized or coincide at all times. The shaft 18 is also provided with a drive pulley 23 for driving the conveyer 16, the feed wheels and the cutting means. A guard 24 is positioned around a portion of the feed wheels 13 and extends from the feed hopper to the conveyer 16 to retain the fish in the pockets therein. The feed wheels 13 are provided with circumferential grooves 13ᶜ, which provide clearance for the resilient extractors 25, which are positioned at the lower portions of the feed wheels, are supported on the support 26, and extend into the feed wheels, substantially as shown in Fig. 4 of the drawings, to facilitate the discharge of the fish from the feed wheels into the conveyers 16. At the outer sides and intermediate the ends of the conveyers 16 are positioned the cutting members 27, which are secured at the ends of the spindle 28, which is revolubly mounted in the journal 29, supported on the frame 2. Said cutting members are provided with a plurality of spiral cutting edges 27ᵃ, which permit of slower speed of the cutting members as well as greater efficiency. Said cutting members are driven by means of a gear 30 secured to the spindle 28, which meshes with a gear 31 secured to the shaft 32, revolubly mounted in the journal 33 supported on the frame 2. Also mounted on and keyed to the shaft 32 is a gear 34 which meshes with and is driven by a gear 35 mounted on and keyed to the shaft 14. At the outer sides of the conveyers 16 and spaced from the outer edges thereof are the positioning guide members 36, which are adjustably supported on the journal members 15 and on brackets secured to the outside of the bins 21, as shown in Figs. 1 and 4 of the drawings. It will be noted that said guide members extend beyond the outer sides of the feed wheels 13 and thence inwardly towards the conveyers, which guide members permit adjustment of the length of the head end of the fish to be cut off by the cutting members 27. It will also be noted that the lower edges of the cutting members 27 extend to within a short distance of the bottom of the channels or pockets in the conveyers 16, and therefore cut only through the back of the fish. Positioned directly below the cutting members 27 and extending forwardly therefrom are the combination cutting and retaining members 37, which are secured to the upper edges of the bins 21, substantially as shown in Fig. 5 of the drawings. The cutting edges of the cutting members 37 consist of small sharp saw teeth, which extend a short distance above the lower portion of the channels in the conveyers 16 and below the lower portion of the cutting members 27, leaving a space between the cutting edges thereof and of the members 27 so that the entrails will not be incised. The teeth of the cutting members 37 are also bent outwardly so that the entrails will not be torn or ruptured when being removed from the body of the fish. Also positioned at the outer sides of the conveyers 16 and forwardly from the cutting members 27 are the paddle wheels 38 revolubly mounted in the journals 39 and 40, supported on the bins 21. The shafts 38ª of said paddle wheels are provided with pulleys 41 for driving the same. A retaining member 42 is positioned forwardly from and in line with the cutting members 27 adjacent the outer sides of the conveyers 16 and positioned upwardly and spaced from each of the members 37. Said members 37 and 42 retain the fish in the pockets or channels of the conveyers when the heads of the same are pulled off by the paddles of the paddle wheels 38, the edible portions of the fish being carried to the forward end of the conveyers from which they are discharged into the bins 43.

It will be noted that the fish are discharged into the chutes 9 and 10 with their heads foremost and by reason of the heavier back portions of the fish and the curvature and shape of said chutes, the fish are gradually turned on their backs, in which position they are discharged into the feed hopper 11 and also into the feed wheels 13. The discharge of the fish from the feed wheels being on the lower side thereof positions the fish in the channels or pockets of the conveyers 16 with their backs upwardly. The adjustable guides 36 so position the fish in the conveyers 16 that the heads of the same are cut off at substantially equal distances from the forward ends, making the fish uniform in size for packing purposes. The fish, conveyed by the conveyers 16 to the cutting members, are simultaneously cut through the back and at the under side, leaving a small portion of the side of the fish intact, which portion is ruptured by the paddle wheels 38 as the fish is fed onward by the conveyers with the head bent downwardly, as shown in Fig. 5 of the drawings, the fish being retained in the conveyers by means of the members 37 and 42, while the paddle wheels remove the head as well as the entrails.

It is obvious from the previous description and accompanying drawings that there is provided a structure as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A machine of the class described, including a fish positioning means, spaced apart cutting members with their cutting edges positioned contiguous to each other and to said fish positioning means, and a rotating member provided with outwardly extending portions adapted to engage the heads of said fish.

2. A machine of the class described, including a fish positioning means, spaced apart cutting members with their cutting edges positioned contiguous to each other and to said fish positioning means, a rotating member provided with outwardly extending portions adapted to engage the heads of said fish after being cut by said cutting members, and guides for said fish.

3. A machine of the class described, including a fish positioning means, spaced apart cutting members with their cutting edges positioned contiguous to each other and to said fish positioning means, a rotating member provided with outwardly extending portions adapted to engage the heads of said fish, and retaining means positioned adjacent said fish positioning means and one of said cutting members for retaining the fish in position in said positioning means.

4. A machine of the class described, including a conveyer provided with pockets, a cutting member positioned contiguous thereto and to one side thereof, adapted to cut partially through the fish, a means positioned contiguous thereto for severing the head from the body of the fish, and means in connection with said conveyer for singly positioning the fish in said conveyer with their backs uppermost.

5. A machine of the class described, including a hopper, a bottomless conveyer, consisting of transversely positioned cleats, positioned contiguous to the lower end of said hopper, a plate positioned below the upper portion of said conveyer and on the side opposite from said hopper, said plate being provided with a pair of spaced apart offset openings, and downwardly inclined chutes communicating with the openings in said plate.

6. A machine of the class described, including a hopper, a bottomless conveyer, consisting of transversely positioned cleats, positioned contiguous to the lower end of said hopper, a plate positioned below the upper portion of said conveyer and on the side opposite from said hopper, said plate being provided with a pair of spaced apart offset openings, downwardly inclined chutes communicating with the openings in said plate, and narrow vertical feed hoppers communicating with the lower free ends of said chutes.

7. A machine of the class described, including a hopper, a bottomless conveyer, consisting of transversely positioned cleats, positioned contiguous to the lower end of said hopper, a plate positioned below the upper portion of said conveyer and on the side opposite from said hopper, said plate being provided with a pair of spaced apart offset openings, downwardly inclined, curved-bottomed chutes communicating with the openings in said plate, narrow vertical feed hoppers communicating with the lower free ends of said chutes, and overflow means in connection with said conveyer and said feed hoppers, adapted to communicate with said supply hopper.

8. A machine of the class described, including a hopper, a bottomless conveyer, consisting of transversely positioned cleats, positioned contiguous to the lower end of said hopper, a plate positioned below the upper portion of said conveyer and on the side opposite from said hopper, said plate being provided with a pair of spaced apart offset openings, downwardly inclined chutes communicating with the openings in said plate, narrow vertical feed hoppers communicating with the lower free ends of said chutes, and a feed wheel, provided with a plurality of pockets in its periphery, communicating with the lower ends of said feed hoppers.

9. A machine of the class described, including a hopper, a bottomless conveyer positioned contiguous to the lower end of said hopper, a plate positioned below the upper portion of said conveyer and on the side opposite from said hopper, downwardly inclined chutes communicating with said conveyer, feed wheels provided with pockets in their peripheries adapted to communicate with the lower ends of said chutes, and conveyers, provided with transverse pockets, positioned at the lower portions of said feed wheels, the pockets thereof corresponding with and synchronized with the pockets of said feed wheels.

10. A machine of the class described, including a hopper, a bottomless conveyer positioned contiguous to the lower end of said hopper, a plate positioned below the upper portion of said conveyer and on the side opposite from said hopper, downwardly inclined chutes communicating with said conveyer, feed wheels provided with pockets in their peripheries adapted to communicate with the lower ends of said chutes, conveyers, provided with transverse pockets, positioned at the lower portions of said feed wheels, the pockets thereof corresponding with and synchronized with the pockets of said feed wheels, cutting means positioned on the outer side of said latter conveyers and contiguous thereto, and a means for engaging the heads of fish positioned in said conveyers.

11. A machine of the class described, including a hopper, a bottomless conveyer positioned contiguous to the lower end of said hopper, a plate positioned below the upper portion of said conveyer and on the side opposite from said hopper, downwardly inclined chutes communicating with said conveyer, feed wheels provided with pockets in their peripheries adapted to communicate with the lower ends of said chutes, conveyers, provided with transverse pockets, positioned at the lower portions of said feed wheels, the pockets thereof corresponding with and synchronized with the pockets of said feed wheels, and a pair of spaced apart cutting members positioned adjacent said latter conveyers with their cutting edges positioned from the bottom of the pockets thereof.

12. A machine of the class described, including a hopper, a bottomless conveyer positioned contiguous to the lower end of said hopper, a plate positioned below the upper portion of said conveyer and on the side opposite from said hopper, downwardly inclined chutes communicating with said conveyer feed wheels provided with pockets in their peripheries adapted to communicate with the lower ends of said chutes, conveyers, provided with transverse pockets, positioned at the lower portions of said feed wheels, the pockets thereof corresponding with and synchronized with the pockets of said feed wheels, a pair of spaced apart cutting members positioned adjacent said latter conveyers with their cutting edges positioned from the bottom of the pockets thereof, and a revolubly mounted paddle wheel positioned contiguous to said cutting members and said latter conveyers.

13. A machine of the class described, including a fish positioning means, and a pair of cutting members positioned contiguous thereto with the cutting edges of said cutting members positioned opposite each other and spaced from each other.

14. A machine of the class described, including a fish positioning means, a pair of cutting members positioned contiguous thereto with the cutting edges of said cutting members positioned opposite each other and spaced from each other, and impact means for engaging the heads of said fish.

In testimony whereof, I have hereunto set my hand at Monterey, California, this 3d day of July, 1923.

OLAV HOVDEN.